United States Patent Office 3,321,424
Patented May 23, 1967

3,321,424
COATING COMPOSITIONS COMPRISING STYRENE-MALEIC ANHYDRIDE COPOLYMER AND POLYEPOXIDE
Paul L. Imes and Philip H. Rhodes, Cincinnati, Ohio, assignors to Swift & Company, Chicago, Ill., a corporation of Illinois
No Drawing. Filed Jan. 6, 1964, Ser. No. 336,017
15 Claims. (Cl. 260—23)

The present invention relates to coating compositions which form films of high gloss and to substrates coated with said coating compositions. More specifically, it concerns coating compositions comprising low-molecular-weight copolymers of styrene or alkyl substituted styrene and maleic anhydride or its derivatives, and a high-oxirane oxygen-containing component.

Styrene-maleic anhydride copolymers have been used in the plastic industry as molding compositions, etc.; however, attempts to form continuous film from such unmodified copolymers have been unsuccessful. For example, unmodified styrene-maleic anhydride resins dispersed in a solvent, such as acetone, when casted upon substrates such as steel and dried does not form a continuous film. Furthermore, it has no flexibility, film integrity or adhesion.

It is, therefore, an object of this invention to provide a coating composition containing styrene-maleic anhydride resins which composition, upon being dried upon an article, exhibits a continuous film of good flexibility, integrity, and adhesion.

It is also an object of this invention to provide coating compositions which result in a film having a high gloss.

A further object is to produce a composition capable of being coated onto a metallic foil for use in the decorative trade.

Other objects, if not specifically set forth herein, will be readily apparent from a reading of the detailed description of the invention.

Generally, the invention comprises a coating composition and a method of applying the coating composition to the surface of articles such as panels, etc. The composition comprises a low-molecular-weight copolymer of styrene and/or alkyl styrene and maleic anhydride or its derivatives and a reactive high-oxirane oxygen-containing ester. The method comprises coating a substrate of a material such as wood, metal or plastic with the composition, followed by curing the resulting film by air drying at room temperature and/or baking to form a tough, high-gloss, continuous film on said substrate. Such films, in addition to being tough and hard, adhere well to the substrate and, also, provide chemical resistance. Metallic foil such as aluminum, tin, copper, etc., when coated with the compositions of this invention and containing a pigment, result in highly colored films of high gloss which are particularly suitable for the decorative trade.

The styrene-maleic anhydride lower-molecular-weight copolymers utilized in the instant coating composition are generally prepare by the peroxide (either organic or inorganic type) copolymerization of the unsaturated monomers, usually in an aromatic solvent. The term "styrene," as used in the instant disclosure and claims, includes the styrene homologues wherein the aromatic portion of the styrene molecule is substituted with one or more alkyl radicals having 1–4 carbon atoms.

The mol ratio of styrene to maleic anhydride may vary from about 1:2 to about 2:1. However, a molar ratio of substantially 1:1 is preferred. By low-molecular-weight is meant styrene-maleic anhydride copolymers having a molecular weight of between about 400 and 4,000 and preferably between about 1,600 and 2,600. For example, a preferred resin is one wherein the resin molecule contains on the average of about 8 styrene-maleic anhydride repeating groups. The copolymers utilized are linear polyanhydrides or their derivatives and they are soluble in dilute aqueous alkaline solutions and in many common organic solvents.

As used in the instant disclosure and claims, the term "styrene-maleic anhydride resin" includes derivatives of maleic anhydride, such as the reaction products of the anhydride group with alcohols, water, bases, ammonia, and amines. The preferred resin has an average of 8 styrene-maleic anhydride groups and has a molecular weight of about 1,600, a melting point range of between about 165–180° C., an acid number of about 500 and a specific viscosity of about 0.67 centistokes at 30° C. (10 gm./100 ml. of acetone). Other suitable resins are those wherein some of the anhydride groups have been broken with water or low-molecular-weight mono- or polyhydric alcohols and alcohol ethers such as the glycol monoalkyl ethers. Examples include the lower alkyl partial esters of styrene-maleic anhydride resins wherein the esterifying alcohol is methyl, ethyl, propyl, isopropyl, butyl, isobutyl, amyl, isoamyl alcohol and methyl, ethyl, butyl cellosolve. Of specific importance are the styrene-anhydride resins having a molecular weight between about 400 and about 2,550 and containing about 2–8 anhydride groups, about 0–6 ester groups and about 0–6 acid groups and wherein the partial esters are esters of glycol monoalkyl ether such as butyl Cellosolve. Specific resins may be identified as having a 1:1 ratio of styrene to maleic anhydride and having: a molecular weight of about 400, 2 anhydride groups, no ester groups and no acid groups; a molecular weight of about 600, 3 anhydride groups, no ester groups and no acid groups; a molecular weight of about 1,600, 8 anhydride groups, no ester groups and no acid groups; a molecular weight of about 2,100, 6 anhydride groups, 2 ester groups of butyl Cellosolve and 2 acid groups; a molecular weight of about 2,300, 4 anhydride groups, 4 ester groups of butyl Cellosolve and 4 acid groups; and a molecular weight of about 2,550, 2 anhydride groups, 6 ester groups of butyl Cellosolve and 6 acid groups. In this connection, partial esters is meant to be those esters wherein only some of the anhydride or acid groups are esterified, in contrast to complete esterification of all anhydride or acid groups.

The styrene-maleic anhydride copolymers employed in accordance with the teachings of the instant invention may be characterized as possessing a specific biscosity, at 30° C., in centistokes (10 gm./100 ml. of acetone), of between about 0.6 to about 0.8. The resins have a melting point below about 200° C., usually below 185° C., with a melting point range of less than or about 15° C.

The particular copolymers utilized are generally prepared by copolymerization of the monomers in an aromatic solvent which is capable of solubilizing the monomers, but which is a nonsolvent for the resulting polymers. Such aromatic solvents function so as to limit the molecular weight of the polymer by solvent termination. That is, while the monomer reactants are soluble in the aromatic solvent, the polymer leaves the polymerization phase and terminates. Accordingly, the copolymers are preferably terminated by an organic aromatic compound which is normally monobenzenoid in character and usually substituted with at least one alkyl radical containing 2 or more carbons. Preferred aromatic solvents are those wherein the alpha carbon on the alkyl side chain contains hydrogen; for example, isopropyl benzene. In some instances, the resulting copolymer of styrene-maleic anhydride may be combined with small amounts (about 1–10%) of the terminating compound.

In brief, the copolymers are produced by reacting substantially equal molar amounts of styrene or its homologues with maleic anhydride dissolved together in the aromatic solvent, along with a small amount of a free radical generating polymerization catalyst. Such catalysts are exemplified by benzoyl peroxide, ditertiary butyl peroxide, dicumene peroxide, methyl ethyl ketone peroxide or other catalyst of the free radical type. The polymerization reaction is initiated by the application of heat. Usually a temperature of between about 75–200° C. is satisfactory. Since the reaction is highly exothermic, cooling means should be supplied so as to keep the reaction under control.

Generally, the polymerization may be accomplished by dissolving the styrene monomer, maleic anhydride, and peroxide catalyst in the aromatic solvent and heating the entire solution as a single mass. An ultimate choice is adding the catalyst and monomer reactant simultaneously to a reaction vessel containing a portion of the selected solvent at the reaction temperature and at a rate not substantially in excess of the rate of conversion of the monomer to the polymer.

The selected solvent for the polymerization is preferably one of the monobenzenoid types containing at least one alkyl radical. Examples of alkyl-substituted benzenes include ethyl benzene, diethyl benzene, triethyl benzene, isopropyl benzene, diisopropyl benzene, triisopropyl benzene, etc. However, other aromatic solvents such as alkoxy-substituted benzenes are suitable. In addition, the aromatic solvents may be substituted with other nonhydrocarbon groups such as nitro or halo groups. Perhaps the only limitation is that the substituted aromatic solvent should not contain substituents which are reactive, under the polymerization conditions, with either the styrene or maleic anhydride monomers. Examples of substituted aromatic solvents include 4-methoxy-1-isopropyl benzene, monochlorocymene, and 4-isopropyl-1-methyl-2-nitrobenzene.

The contemplated styrene-maleic anhydride resins utilized in the instant invention may be insolubilized with formaldehyde or formaldehyde-containing resins and with multivalent metal cation such as aluminum. In general, the copolymer resins are soluble in aqueous dilute alkali solutions, chlorinated hydrocarbons, ketones, esters, and alcohols. They are insoluble in aromatics, glycols, and polyglycols, ethers and glycols, and aliphatics. The partially esterified resins, which are preferred in some instances, are soluble in aqueous dilute alkali solutions, chlorinated hydrocarbons, ketones, ethers, glycol-ethers, esters and alcohols. They are insoluble in aromatics, glycols, polyglycols and aromatics.

In forming the coating compositions of this invention, it is preferred to dissolve the styrene-maleic anhydride resins in a particular solvent such as methyl ethyl ketone, acetone, etc. Normally, the high-oxirane-oxygen-containing esters are also dissolved in a like solvent and then added to the resin solution. The direct blending of the resin with epoxy compound, in the absence of a solvent, is not recommended since such a mixture results in an agglomeration of particles. In combining the resin with the epoxy compound, it is desirable to use between 1:1 to 1:2, preferably 1:1.25 to 1:1.75, parts by weight of resin to epoxy compound. A specific example is 3 parts of epoxy oil for 2 parts of resin, said resin consisting of styrene and maleic anhydride in a 1:1 ratio. If too little oil is used, the film will tend to become brittle and if too much oil is used, the film will not dry properly.

The epoxy components utilized in the instant invention comprise polyfunctional reactive esters of high-oxirane-containing fatty acids with di- and/or polyhydric aliphatic alcohols. These esters are low-viscosity oils possessing little or no color. The esters may be characterized as high-oxirane fatty materials containing a plurality of oxirane rings or epoxy groups at those points in the fatty acyl radical which are normally occupied by double bonds in the original nonepoxidized fatty acid or ester.

Polyhydric alcohol esters of the high-oxirane fatty esters which are contemplated include aliphatic alcohol esters of di- and polyhydric alcohols having 2–8 carbons. Generally, the suitable aliphatic alcohols are selected from the paraffin and olefin series and such alcohols may be substituted, if desired, with noninterfering substituents. The epoxy fatty acid component is made up of epoxy fatty acids having about 10–30 carbons and having an oxirane-oxygen content above about 8.5%. In this connection, it is pointed out that the epoxy esters may be made by esterifying the unsaturated acid, followed by epoxidation or by epoxidizing a simple ester, such as the methyl ester of an unsaturated acid, followed by interesterification.

Dihydric alcohols useful for esterifying the unsaturated acid prior to epoxidation include the lower glycols, such as ethylene glycol, 1,2-propanediol, 1,3-propanediol, dimethyl ethylene glycol, trimethylene glycol, tetramethylene glycol, 1,4-butene diol, 1,4-butyene diol, and on up to and including hexamethylene glycol.

The polyhydric alcohol esters of the high-oxirane fatty acids include the tri-, tetra-, penta-, and hexahydric alcohol esters of the various fatty acids. Included within this group are those aliphatic alcohols having 3–8 carbons and 3 or more alcohol groups with the proviso that there is present at least one carbon for each hydroxyl group. These alcohols include glycerol, erythritol, pentaerythritol, and the hexitols such as mannitol or sorbitol.

The epoxy fatty acid portion of the unique esters utilized in this invention is made up of those fatty acids and mixtures of fatty acids having 10–30 carbons and an oxirane-oxygen content above about 8.5% and preferably above about 8.8%. Various methods for determining the oxirane content of a given high-oxirane oxygen ester or mixture of esters are well known and, while the preferred technique is the American Oil Chemists Society tentative method Cd–9–57, described in Official and Tentative Methods of the American Oil Chemists Society, second edition, 1946, including additions and revisions, 1947–1958, inclusive, other analytical methods known in the art may be employed. The method described by A. J. Durbetaki, Analytical Chemistry, vol. 28, No. 12, December 1956, pp. 2,000 and 2,001, is also suitable for determining the oxirane content.

It is preferred to use substantially unsaturated acids; however, commercial mixtures of naturally-occurring mixtures of saturated and unsaturated acids may be employed. In such a case, the saturated acid content of the fatty acid mixture should preferably not exceed about 10–15%. Accordingly, the presence of such saturated acids such as stearic, palmitic, myristic acid, etc., should for best results be held to a minimum. Moreover, the fatty acyl moiety should not be hydroxylated or contain conjugated or terminal unsaturation, i.e., the epoxy component contains internal or nonterminal epoxy groups. Mixtures containing epoxy stearic, diepoxy stearic, triepoxy stearic, diepoxy eicosanoic, triepoxy eicosanoic, diepoxy docosanoic, triepoxy docosanoic, and up to pentaepoxy tetracosanoic acids are a very desirable source of the oxirane-supplying radical.

Suitable naturally-occurring oils, which when substantially completely epoxidized, may be used in practicing the invention are those vegetable and marine triglycerides containing not more than about 10%, saturated fatty acids and containing a predominant amount of unsaturated fatty acids. These naturally-occurring oils should have a degree of unsaturation represented by an iodine value of at least about 150 and preferably about 170 to about 210, and should be neither hydroxylated nor possess predominate amounts of conjugated unsaturation. The linolenic acid oils which are primarily triglycerides of linoleic and linolenic acids are preferred. Among those oils which may be employed are highly epoxidized perilla oil and highly epoxidized linseed oil having an epoxy oxygen content of about 9.5%.

The above-mentioned naturally-occurring highly unsaturated oils are also a valuable source of fatty acid mixtures. Purified and concentrated fatty acid mixtures containing a large amount of unsaturated fatty acids may be obtained from such vegetable oils as soybean oil and tall oil or from the fish and whale oils. These materials must first be refined to concentrate the more highly unsaturated components and remove at least a portion of the saturated acids. The fish oils in particular have a high degree of unsaturation, as represented by iodine values as high as about 270, but they normally contain too great a quantity of saturated acids. Therefore, these materials are first treated to reduce the saturated acid content below about 10%. A specific, highly unsaturated acid is clupanodonic acid (5 double bonds), which may be obtained from fish oils and whale oil.

In order for the epoxy fatty acid ester to be effective, it is necessary that the fatty acyl portion of the ester have an oxirane-oxygen content of above about 8.5% and, as a practical matter, in the range about 8.8% to about 12.5%. The preferred oxirane content of the fatty acyl component is around 9.0% to about 9.5%. This preferred oxirane-oxygen content is easily obtained from a mixture of esters of epoxy-containing fatty acids containing less than about 10% saturated fatty acids and consisting, prior to epoxidation, of predominant amounts of the di-, tri-, tetra-, and pentathenoic acids. A particularly desirable fatty acid mixture is one containing large amounts of epoxy linoleic and linolenic acids. This preferred mixture is readily obtained from naturally-occurring linseed oil or perilla oil by subjecting such oils to an epoxidation treatment. The epoxidation of unsaturated acids or mixtures of such acids, as well as glyceride oils, is well known and details of such procedures will not be set forth herein.

Strong and hard thermosetting resins from polybasic acid anhydrides and polyepoxides having a relatively high oxirane-oxygen content have been produced in the past; however, the said polyepoxide compounds were required to be neutralized and contained, as a critical necessity, from 10 up to 2,000 parts per million of a mono-valent alkali metal, such as sodium, and preferably a quaternary ammonium halide catalyst or a tertiary amine catalyst. The epoxy compounds of this invention do not require alkali metal nor quaternary ammonium halide or amine catalysts.

The following examples are for illustrative purposes only and should in no way be construed as a limitation on the invention.

*Example I*

A 50%, by weight, solution of a styrene-maleic anhydride copolymer in methyl ethyl ketone was flow-coated on a clean panel of steel. The styrene-maleic anhydride copolymer used possessed 6 anhydride groups, 2 butyl Cellosolve ester groups, 2 acid groups, and had the following characteristics:

Molecular weight _____ 2,100
Form _____ Powder
Acid number _____ 300
Melting range, ° C. _____ 130–145
Specific viscosity at 30° C., centistokes (10 gm./
  100 ml. acetone) _____ 0.66
True density, lbs./cu. ft. _____ 76
Bulk density, lbs./cu. ft. _____ 39
Stick point, ° C. _____ 100–120
Refractive index at 25° C. _____ 1.54

The coated panel was air-dried for 15 minutes and then oven-dried for 10 minutes at 350° F. An inspection of the resulting film showed that it was hard, brittle, and checked. It had no flexibility or film integrity and its adhesion was poor.

*Example II*

10 grams of a 50% solution of the styrene-maleic anhydride of Example I was mixed with 5 grams of epoxidized linseed oil having an oxirane-oxygen content of 9.0%. The resulting composing, having a 1:1 ratio of epoxidized oil to resin was coated on steel panels, dried, and heat-treated as previously described in Example I. An inspection of the cured film showed that it had good adhesion, adequate hardness, and flex-resistance. The high-gloss film could be bent 180° without fracture or loss of adhesion at the point of bend.

*Example III*

10 parts, by weight, of a 50% solution of a styrene-maleic anhydride copolymer in methyl ethyl ketone was mixed with 5 parts, by weight, of epoxidized linseed oil having an oxirane-oxygen content of about 9.0%. The syrene-maleic anhydride copolymer possessed 4 anhydride groups, 4 butyl Cellosolve groups, 4 acid groups, and had the following characteristics:

Molecular weight _____ 2,300
Form _____ Powder
Acid number _____ 245
Melting range, ° C. _____ 105–120
Specific viscosity at 30° C., centistokes (10 gm./
  100 ml. acetone) _____ 0.64
True density, lbs./cu. ft. _____ 74
Bulk density, lbs./cu. ft. _____ 36
Stick point, ° C. _____ 80–95
Refractive index at 25° C. _____ 1.54

The epoxidized oil-resin composition was flow-coated on a clean steel panel. The coated panel was air-dried for about 15 minutes and over-dried for about 10 minutes at 350° F. The resulting coating was considered satisfactory, had a high gloss, could be flexed without cracking, and withstood a 180° bend without fracture.

*Example IV*

10 parts, by weight, of a 50% solution of a styrene-maleic anhydride resin in methyl ethyl ketone was mixed with 7.5 parts, by weight, of epoxidized linseed oil having an oxirane-oxygen content of about 9.0%. The styrene-maleic anhydride resin used possessed 2 anhydride groups, 2 butyl Cellosolve groups, 2 acid groups, and had the following characteristics:

Molecular weight _____ 2,550
Form _____ Powder
Acid number _____ 186
Melting range, ° C. _____ 95–110
Specific viscosity at 30° C., centistokes (10 gm./
  100 ml. acetone) _____ 0.65
True density, lbs./cu. ft. _____ 72
Bulk density, lbs./cu. ft. _____ 32
Stick point, ° C. _____ 55–70
Refractive index at 25° C. _____ 1.54

The epoxidized oil-resin solution was flow-coated on a clean steel panel, dried, and baked with the same cycle as set forth in the above examples. The resulting coating had a tough, hard, high-gloss finish, and withstood flexing. The film did not fracture when subjected to a 180° bend and withstood loss of adhesion at the point of bend.

*Example V*

30 parts, by weight, of a 33⅓% solution of a styrene-maleic anhydride resin acetone was mixed with 15 parts, by weight, of epoxidized linseed oil having an oxirane-oxygen content of about 9.0%. The styrene-maleic anhydride resin used had the following properties:

Molecular weight _____ 1,600
Stick point, ° C. _____ 140–155
Melting range, ° C. _____ 165–180
Acid number _____ 500

Specific viscosity at 30° C., centistokes (10 gm./ 100 ml. acetone) _____ 0.67
True density, lbs./cu. ft. _____ 76
Bulk density, lbs./cu. ft. _____ 35
Refractive index at 25° C. _____ 1.59

The expoxidized oil-resin composition was flow-coated on a steel panel, air-dried for 15 minutes, and baked for 30 minutes at 350° F. It produced a hard, high-gloss, flexible film which could be bent 180° without fracture.

*Example VI*

A coating composition comprising 100 grams of the styrene-maleic anhydride resin solution of Example V, 67 grams of epoxidized linseed oil having an oxirane-oxygen content of about 9.0%, and 1.0 gram of a dye was applied to aluminum foil. The solvent was evaporated and the coating cured at 425° F. A flexible, tough, high-gloss coating on the foil was produced. This type of coating is an example of a means for coloring aluminum foil for the decorative trade. A similar coating comprising epoxidized soybean oil (oxirane-oxygen content of about 7%) was cured at 375° F. The resulting coating was not as smooth nor did it possess the high gloss as the coating compositions wherein the epoxy oil had a high-oxirane-oxygen content.

Normally, the coating composition is diluted in a solvent such as a ketone and applied by spraying, brushing, roller-coating, etc. The coated panels are usually air-dried for about 5 to 60 minutes to get out the solvent; however, 10 to 15 minutes is normally sufficient. While the curing time may vary, it is preferred to bake the coated articles for 60 to 2 minutes at a temperature of about 200 to 450° F. However, the products may be cured at room temperature for prolonged times, such as 2-4 weeks.

As discussed above, a 1:1 ratio of resin to epoxy compound may result in films which exhibit some degree of cracking and loss of adhesion at the point of bend. Accordingly, it is preferred to use a weight ratio of styrene-maleic anhydride resin to epoxy compound of about 1:1 to 1:2, with a range of about 1:1.25 to 1:1.75 being the most preferred. A ratio of resin to epoxy compound of 1:1.5, containing pigment, results in a highly colored film of high gloss. Such films possess excellent flexibility and are able to withstand a 180° bend without fracture or loss of adhesion at the point of bend.

A wide range of different types of pigments and/or dyes may be incorporated into the coating compositions of this invention. Examples include TiO₂ for a white color, Imperial Chrome Yellow X2548, Imperial Monochrome Green A4460, Harshaw Scarlet Red 25AD, Imperial Monarch Blue X2658, and Sterling Carbon Black.

In addition, various diluents may be used to advantage and the weight percent of the solvent may be varied, depending upon the desired viscosity and drying requirements.

The coatings produced in accordance with this invention may be characterized as possessing extremely high gloss. Samples were placed in an Atlas Weather-O-Meter and exposed for some time, after which they were evaluated and found to be fair to good in gloss retention. Other sample panels were placed on roof exposure, 45° south, and were examined throughout an aging period of seven months, during which time gloss retention was excellent. Other samples were exposed as clear coatings on redwood siding with good results compared to a spar varnish and to a commercial urethane coating.

Obviously, many modifications and variations of the invention as hereinbefore set forth may be made without departing from the spirit and scope thereof, and therefore only such limitations should be imposed as are indicated in the appended claims.

We claim:

1. A reactive coating composition comprising a mixture of a low-molecular weight copolymer of styrene and a maleic anhydride copolymerized in molar proportions of about 1:2 to about 2:1 and a reactive polyfunctional substantially hydroxyl-free epoxy ester of an aliphatic polyhydroxy compound containing about 2-8 carbon atoms and fatty acids containing about 10-30 carbon atoms, said ester having an oxirane oxygen content above about 8.5%.

2. A reactive coating composition comprising a mixture of a low-molecular weight copolymer of styrene and a maleic anhydride copolymerized in molar proportions of about 1:2 to about 2:1 and an epoxy triglyceride having an oxirane oxygen content above about 8.5%.

3. A reactive coating composition comprising a copolymer of styrene and a maleic anhydride copolymerized in molar proportions of about 1:2 to about 2:1, said copolymer having a molecular weight of between about 400 and about 4,000 and a reactive polyfunctional substantially hydroxyl-free epoxy ester of an aliphatic polyhydroxy compound containing about 2 to 8 carbon atoms and fatty acids containing about 10 to about 30 carbon atoms, said ester having an oxirane oxygen content of between about 8.5% and about 12.5%.

4. The composition of claim 3, wherein the epoxy ester is an epoxy triglyceride having an oxirane oxygen content of between about 8.8% and about 9.5%.

5. The composition of claim 3, wherein the epoxy ester is present in a ratio of about 1-2 parts, by weight, for about 1 part, by weight, of said copolymer.

6. The composition of claim 3, wherein the epoxy ester is epoxidized linseed oil.

7. A reactive coating composition comprising a low-molecular weight copolymer of styrene and a maleic anhydride copolymerized in molar proportions of about 1:2 to about 2:1 and a reactive polyfunctional substantially hydroxyl-free epoxy ester of an aliphatic polyhydroxy compound containing about 2-8 carbon atoms and fatty acids containing about 10 to 30 carbon atoms, said ester having an oxirane oxygen content above about 8.5% and said copolymer having a molecular weight of between about 400 and about 4,000 and having 2-8 anhydride groups, 0-6 ester groups derived from monohydric alcohol and 0-6 acid groups.

8. The composition of claim 7, wherein the maleic anhydride portion of the copolymer is partially esterified with a glycol monoalkylether.

9. The composition of claim 7, wherein the epoxy ester is epoxidized linseed oil.

10. An article of manufacture and a film thereon, said film comprising the cured reaction product of a copolymer of styrene and a maleic anhydride copolymerized in molar proportions of about 1:2 to about 2:1 and having a molecular weight of between about 400 and 4,000, and a reactive polyfunctional substantially hydroxyl-free epoxy ester of an aliphatic polyhydroxy compound containing about 2-8 carbon atoms and fatty acids containing about 10 to 30 carbon atoms, said ester having an oxirane oxygen content above about 8.5%.

11. An article of manufacture comprising a base material and a film on said material, said film comprising the cured reaction product of about 1.25-1.75 parts, by weight, of an oxirane-oxygen-containing triglyceride having an oxirane oxygen content of between about 8.5% and about 12.5%, and about 1 part, by weight, of a styrene-maleic anhydride copolymer having a molar ratio of styrene to maleic anhydride of about 1:2 to about 2:1, said styrene maleic anhydride copolymer possessing a molecular weight of between about 1,600 and about 2,600.

12. The article of claim 11, wherein the base material is a metal.

13. The article of claim 11, wherein the base material is selected from the group consisting of aluminum foil, tin foil and copper foil.

14. The article of claim 11, wherein the triglyceride is epoxidized linseed oil.

15. A coating composition comprising about 15 parts, by weight, of epoxidized linseed oil having an oxirane-oxygen content of about 9.0%, and about 30 parts, by weight, of a 33⅓% solution of styrene-maleic anhydride resin in acetone, said styrene-maleic anhydride resin possessing the following characteristics:

| | |
|---|---|
| Molecular weight | About 1,600 |
| Stick point, °C. | About 140–155 |
| Melting range, °C. | About 165–180 |
| Acid number | About 500 |
| Specific viscosity (10 gm./100 ml. of acetone) at 30° C. in centistokes | About 0.67 |
| True density lb./cu. ft. | About 76 |
| Refractive index at 25° C. | About 1.59 |

References Cited by the Examiner

UNITED STATES PATENTS

| | | | |
|---|---|---|---|
| 2,848,433 | 8/1958 | Eirich | 260—837 |
| 2,949,438 | 8/1960 | Hicks | 260—23 |
| 2,967,162 | 1/1961 | Vasta | 260—21 |
| 2,993,920 | 7/1961 | Budde et al. | 260—23 |
| 3,030,332 | 4/1962 | Lombardi et al. | 260—23 |
| 3,085,986 | 7/1962 | Muskat | 260—32.8 |
| 3,136,736 | 6/1964 | Washburne et al. | 260—837 |

LEON J. BERCOVITZ, *Primary Examiner.*

R. A. WHITE, *Assistant Examiner.*